US010996101B2

(12) United States Patent
Rao et al.

(10) Patent No.: US 10,996,101 B2
(45) Date of Patent: May 4, 2021

(54) DISTRIBUTED ACOUSTIC SENSING SYSTEM BASED ON SPACE-DIVISION MULTIPLEXING WITH MULTI-CORE FIBER

(71) Applicant: University of Electronic Science and Technology of China, Sichuan (CN)

(72) Inventors: Yunjiang Rao, Sichuan (CN); Yun Fu, Sichuan (CN)

(73) Assignee: University of Electronic Science and Technology of China, Sichuan (CN)

( * ) Notice: Subject to any disclaimer, the term of this patent is extended or adjusted under 35 U.S.C. 154(b) by 127 days.

(21) Appl. No.: 16/289,657

(22) Filed: Mar. 1, 2019

(65) Prior Publication Data

US 2019/0226908 A1 Jul. 25, 2019

(30) Foreign Application Priority Data

Dec. 17, 2018 (CN) .......................... 201811541413.5

(51) Int. Cl.
*G01H 9/00* (2006.01)
*H04J 14/00* (2006.01)
*G02B 6/42* (2006.01)
*H04J 14/04* (2006.01)
*G01V 8/24* (2006.01)
*G01V 8/16* (2006.01)

(52) U.S. Cl.
CPC ........... *G01H 9/004* (2013.01); *G02B 6/4208* (2013.01); *H04J 14/00* (2013.01); *H04J 14/04* (2013.01); *G01V 8/16* (2013.01); *G01V 8/24* (2013.01)

(58) Field of Classification Search
CPC ....... G01H 9/004; G02B 6/4208; H04J 14/00; H04J 14/04; E21B 47/107; G01V 8/16; G01V 8/24
USPC ..................................................... 73/653, 643
See application file for complete search history.

(56) References Cited

U.S. PATENT DOCUMENTS

| 2014/0112615 A1* | 4/2014 | Kreger | G01B 11/18 |
| | | | 385/13 |
| 2014/0369659 A1* | 12/2014 | Uemura | G02B 6/4471 |
| | | | 385/126 |
| 2017/0211970 A1* | 7/2017 | Milione | G01H 9/004 |

(Continued)

FOREIGN PATENT DOCUMENTS

WO WO-2015163963 A2 * 10/2015 ......... G01D 5/35329

*Primary Examiner* — Lisa M Caputo
*Assistant Examiner* — Rose M Miller (57) ABSTRACT

A distributed acoustic sensing (DAS) system based on space-division multiplexing with multi-core fiber (MCF) is proposed. It relates to a technical field of distributed optical fiber sensing. The present invention maintains the advantage of single-ended measurement in the standard DAS system, and realizes the intensity accumulation of the Rayleigh backscattering light within each core of the MCF, which can greatly improve the strain resolution of DAS systems. Moreover, the introduction of optical switch can make different code sequences transmit in the different core of the MCF simultaneously, which can make the single-pulse response with coding gain demodulated without sacrificing the frequency responding bandwidth. Furthermore, the utilization of space-division multiplexing can make multiple pulses with precious time delay transmit in the MCF simultaneously, which can greatly improve the frequency responding bandwidth of DAS system.

6 Claims, 4 Drawing Sheets

(56) References Cited

U.S. PATENT DOCUMENTS

2017/0343791 A1* 11/2017 Swanson ............ G01B 9/02091
2018/0052102 A1* 2/2018 Yaman .................. G01K 11/32

* cited by examiner

DISTRIBUTED ACOUSTIC SENSING SYSTEM BASED ON SPACE-DIVISION MULTIPLEXING WITH MULTI-CORE FIBER

CROSS REFERENCE OF RELATED APPLICATION

The present invention claims priority under 35 U.S.C. 119(a-d) to CN 201811541413.5, filed Dec. 17, 2018.

BACKGROUND OF THE PRESENT INVENTION

Field of Invention

The present invention relates to signal multiplexing technology and a technical field of distributed optical fiber sensing, and more particularly to a distributed acoustic sensing system based on space-division multiplexing with multi-core fiber.

Description of Related Arts

Due to the rapidly increasing demands of communication capacity in modern society, various types of multiplexing technologies are constantly developing, which make the capacity of standard optical fiber increase by a factor of 10 every four years. However, standard optical fiber will reach its capacity limits in the next decade. In order to meet the urgent requirements of communication capacity, the technology of space-division multiplexing (SDM) has been boomed in recent years. Up to now, devices such as multi-core fiber (MCF) and multi-mode fiber required by SDM have achieved practical level, and meanwhile the cost has been greatly reduced, so SDM is expected to become one of the most representative technologies of the next information age.

Distributed optical fiber sensing (DOFS) is widely used in seismic monitoring, safety monitoring in large-scale projects, and intrusion detection, which is one of the key technologies for the implementation of wide-area Internet of Things. Among so many DOFS technologies, distributed acoustic sensing (DAS) systems based on phase demodulation of Rayleigh backscattering light within optical fiber have attracted much attention in recent years, due to their high sensitivity and good real-time performance. In particular, the technologies of chirp pulses with coherent detection or cross-correlation demodulation, and of optical pulse coding have been rapidly developed in the past two years, which make the strain resolution of DAS systems reach pico-strain level, while make the sensing distance above 50 km.

However, DAS systems with standard single-core optical fiber still have two problems. Firstly, a power of probe pulses is limited by a nonlinear effect threshold of the optical fiber, resulting in low intensity of Rayleigh backscattering light, so a strain resolution of the system is hard to improve. Secondly, for external acoustic signals, a sampling rate is limited by the length of the fiber under test (FUT). In the prior art, the optical pulse coding technology can alleviate the first problem, but if this technology is used, the response of single pulse should be demodulated after inputting several columns of code sequences. Thus, for DAS systems with optical pulse coding, the maximum responding frequency of external acoustic signal is reduced. As far as the second problem, in the prior art, frequency division multiplexing (FDM) can theoretically it. However, if the number of employed intermediate frequencies (IF) increases, the higher requirements of the front-end modulator bandwidth and the back-end sampling rate for electrical signal there will be. In addition, in order to avoid the signal crosstalk at different IF, the interval of the used adjacent IF needs to be sufficiently large. Based on the above reasons, the ability of FDM to increase the responding bandwidth of external acoustic signals is limited. Moreover, due to the characteristic of single-ended measurement, DAS systems have outstanding application prospects in extremely harsh environments, such as high temperature under downhole or high pressure in deep-sea. In summary, a novel DAS system that can greatly improve the strain resolution and the responding bandwidth, and can be used in different environments needs to be developed.

SUMMARY OF THE PRESENT INVENTION

An object of the present invention is to provide a DAS system based on SDM with MCF, in order to solve the problem of low strain resolution and limited responding bandwidth of conventional DAS systems with standard single-core optical fiber.

Accordingly, in order to accomplish the above objects, the present invention provides:

a DAS system based on SDM with MCF, comprising: a signal generating device, and a signal receiving and demodulating device, and further comprising: a MCF and a signal space-division transceiver array; wherein the signal generating device, the signal space-division transceiver array, the MCF, and the signal receiving and demodulating device are sequentially connected to realize a single-ended DAS system based on the Rayleigh backscattering light within MCF.

Preferably, the signal space-division transceiver array comprises a circulator array, and a fan-in and fan-out device; pulse sequences output from the signal generating device input into the first ports of the circulator array, and then output from the second ports of the circulator array, after that, they are input into the MCF through the fan-in and fan-out device for transmission; a Rayleigh backscattering light of the MCF transmits into the signal receiving and demodulating device from the fan-in and fan-out device through the third ports of the circulator array;

the signal receiving and demodulating device comprises a signal combiner, an optical amplification and phase extraction module, a photodetector and a signal demodulation module, and they are connected in sequence; the Rayleigh backscattering light of the MCF is input into the light combiner from the signal space-division transceiver array, in order to perform intensity accumulation of Rayleigh backscattering light in optical domain.

Preferably, the peak power $Q_i$ and repetition rate $R_{add}$ of the modulated pulse sequences output from the M channels of the signal generating device are as follows:

$$Q_i = P + q_i$$

$$R_{add} = c/(2Ln)$$

where M is a core number of the MCF; P is an intensity threshold of pulse peak power within standard optical fiber; $q_i$ is a whole insertion loss of signal transmitted in the i-th channel from a signal splitter to the fan-in and fan-out device, wherein i≤M; c is a vacuum light speed; L is a length of the FUT; and n is an optical fiber refractive index.

Preferably, the signal space-division transceiver array comprises a circulator array, and a fan-in and fan-out device; multi-line pulse sequences output from the signal generating device are transmitted from the first ports of the circulator array to the second ports, and then are input into the MCF through the fan-in and fan-out device for transmission;

the signal receiving and demodulating device comprises an optical amplification and phase extraction module, a photodetector array and a signal demodulation module; the Rayleigh backscattering light within each core of the MCF is output from the fan-in and fan-out device through the third ports of the circulator array, and then sequentially connects the optical amplification and phase extraction module, the photodetector array, and the signal demodulation module, in order to perform signal reception and demodulation after digital signal accumulation.

Preferably, an output signal of the signal demodulation module is a sum of signals received in each channel of the photodetector array; the peak power $Q_i$ and repetition rate $R_{add}$ of the modulated pulse sequences output from the M channels of signal generating device are as follows:

$$Q_i = P + q_i$$

$$R_{add} = c/(2Ln)$$

where M is the core number of the MCF; P is a peak power limit of probe pulses within an standard single-mode optical fiber; $q_i$ is an insertion loss of signal transmitted from the i-th channel of the signal splitter to the fan-in and fan-out device, wherein i≤M; c is a vacuum light speed; L is a length of an FUT; and n is an optical fiber refractive index.

Preferably, the signal generating device comprises a narrow linewidth laser, a pulse modulation module modulating a continuous pulse sequence, a signal splitter, and an optical switch, and they are connected in sequence; the optical switch simultaneously outputs different pulse coding sequences into the M output channels, where M is a core number of the MCF;

the signal space-division transceiver array comprises a circulator array, and a fan-in and fan-out device; the multi-line pulse coding sequences output from the signal generating device transmit into the second ports from the first ports of the circulator array, and then are input into the MCF through the fan-in and fan-out device;

the signal receiving and demodulating device comprises an optical amplification and phase extraction module, a photodetector array and a signal demodulation module; the Rayleigh backscattering light within each core of the MCF is output from the fan-in and fan-out device through the third ports of the circulator array, and then sequentially transmits into the optical amplification and phase extraction module, the photodetector array, and the signal demodulation module.

Preferably, for the pulse sequences output from the pulse modulation module, an interval time w between adjacent pulses must satisfy the following condition:

$$w > 2\Delta t_{switch}$$

where $\Delta t_{switch}$ is a fastest switching time of the optical switch;

the pulse coding sequences output from the optical switch must satisfy the following conditions:

$$m < M$$

$$(b-1)w + \tau < \frac{c}{2Ln}$$

where τ is a pulse width output from the pulse modulation module; m is a column number of pulse coding sequences output from the optical switch; b is a bit number contained in each pulse coding sequence; c is a vacuum light speed; L is a length of the FUT; and n is an optical fiber refractive index.

The present invention also provides a DAS system based on SDM with MCF, comprising: a signal receiving and demodulating device, and further comprises: a signal generating device for generating multi-channel pulse sequences with precise time delay, a MCF and a signal space-division transceiver array; wherein the signal generating device, the signal space-division transceiver array, the MCF, and the signal receiving and demodulating device are sequentially connected to realize single-ended DAS based on the Rayleigh backscattering light within the MCF.

Preferably, the signal generating device comprises a narrow linewidth laser, a pulse modulation module that can output continuous pulse sequences, a signal splitter, and an optical switch to accurately delay the response time of each core of the MCF; and they are connected in sequence; the optical switch accurately delays the pulse input time of each output channel of the signal splitter;

the signal space-division transceiver array comprises a circulator array, and a fan-in and fan-out device; the multi-line pulse coding sequences output from the signal generating device transmit into the second ports from the first ports of the circulator array, and then are input into the MCF through the fan-in and fan-out device;

the signal receiving and demodulating device comprises an optical amplification and phase extraction module, a photodetector array and a signal demodulation module;

a Rayleigh backscattering light within each core of the MCF is output from the fan-in and fan-out device through the third ports of the circulator array, and then sequentially transmits into the optical amplification and phase extraction module, the photodetector array, and the signal demodulation module, in order to delay the receiving time of the response of each core in the MCF.

Preferably, a repetition rate R of the pulse sequences output from the pulse modulation module in the signal generating device is Mc/2Ln; a pulse repetition rate of the pulse sequences output from each channel of the optical switch is c/2Ln; and an input pulse time delay between adjacent channels is 2Ln/(M−1)c; wherein M is a core number of the MCF; c is a vacuum light speed; L is a length of the MCF; and n is an optical fiber refractive index.

In summary, due to the adoption of the above technical solutions, the beneficial effects of the present invention are:

1. The present invention performs SDM on the Rayleigh backscattering light within MCF, and by accumulating the intensity of the Rayleigh backscattering light within each core of MCF, the overall optical signal-to-noise ratio (OSNR) of the DAS system is improved, thereby improving the strain resolution of the DAS system. Through the use of SDM on the Rayleigh backscattering light within MCF, and the employment of the optical switch to accurately delay the response time of each core in the MCF, for the DAS system, the sampling rate of the external acoustic signals can be improved and the responding frequency bandwidth of external acoustic signals can be broadened;

2. In order to improve the intensity of Rayleigh backscattering light greatly, the optical signal combiner and the signal space-division transceiver array are used to accumulate the received power of each core in the MCF, namely sum the light intensity. It breaks through the bottleneck that the peak power limit of probe pulses in DAS system with standard single-core optical fiber is depended on the nonlinear threshold of the optical fiber, which can greatly improve the OSNR of the DAS system, thereby improving the strain resolution of the DAS system;

3. In order to increase the intensity of the Rayleigh backscattering light greatly, the present invention uses the signal space-division transceiver array, the MCF and the photodetector array to accumulate the electrical signals output from each core of the MCF, namely sum the digital signals. It breaks through the bottleneck that the peak power limit of probe pulses in the DAS system with standard single-core optical fiber depends on the nonlinear threshold of the optical fiber, which can improve the OSNR of the DAS system, thereby improving the strain resolution of the DAS system;

4. The signal space-division transceiver array and the optical switch of the present invention are combined to modulate the multi-line pulse coding sequences, and then input them into different cores of the MCF respectively. Therefore, the responses of different coding sequences can be simultaneously received, thereby rapidly demodulating the response of single pulse with the corresponding coding gain can be achieved. It overcomes the effects in the condition that optical pulse coding is used in the DAS system with standard single-core optical fiber. That is to say, the DAS system can greatly improve the OSNR while not sacrificing the responding frequency bandwidth through the coding gain, thereby improving the strain resolution of the DAS system;

5. The present invention employs the signal space-division transceiver array and the optical switch for accurately delaying the receiving time of the Rayleigh backscattering light within each core of the MCF. It realizes the reception of the response in each core with accurate time delay, and for DAS system, the sampling rate of external acoustic signals can be improved, so the responding frequency bandwidth of the DAS system to the external acoustic signals can be increased.

BRIEF DESCRIPTION OF THE DRAWINGS

In order to illustrate technical solutions of embodiments of the present invention more clearly, drawings to be described in the embodiments will be briefly described below.

DETAILED DESCRIPTION OF THE PREFERRED EMBODIMENT

Figure 1:
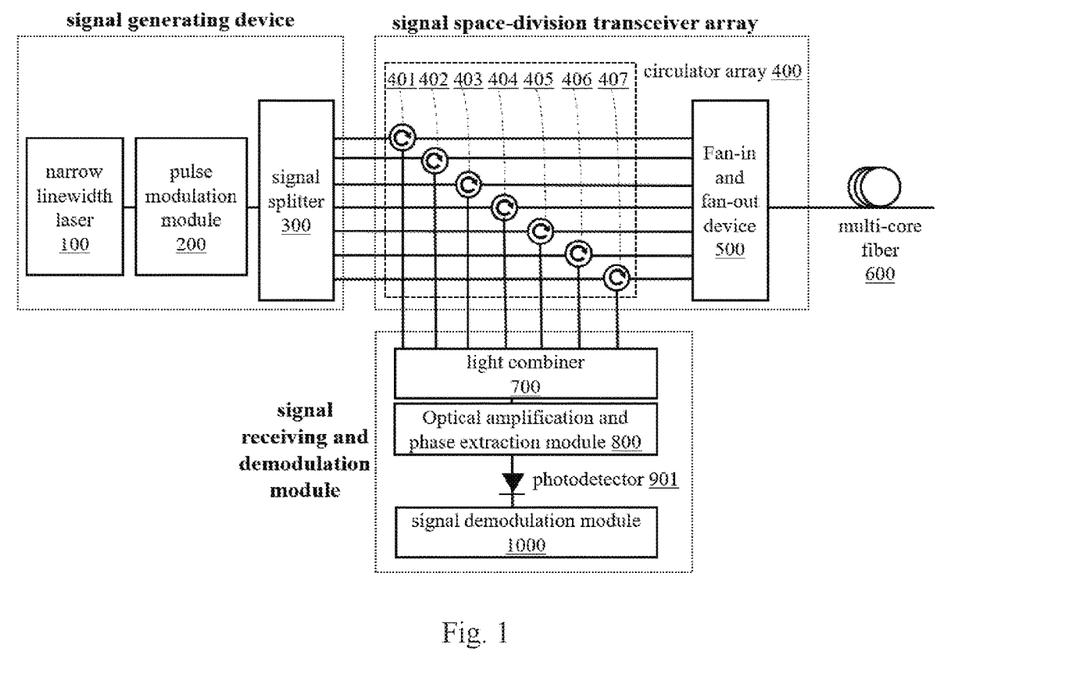
FIG. 1 is a system block diagram of an embodiment 1 of the present invention.

Referring to FIG. 1 of the drawings, according to a preferred embodiment of the present invention is illustrated, wherein/comprising Embodiment 1

The external acoustic signal can locally change the length and the refractive index of the FUT, thereby the phase modulation within the Rayleigh backscattering light is induced by the probing pulse; the DAS system can locate and quantify the external acoustic signal by demodulating the phase change of the Rayleigh backscattering light.

Normally, the intensity of the Rayleigh backscattering light is very weak, which makes the OSNR of the DAS systems low, so that it greatly limits the strain resolution of the DAS system. Increasing the width and the power of probe pulses both contribute to the intensity improvement of the Rayleigh backscattering light. However, since the spatial resolution of the DAS system is determined by the width of the probe pulses, the pulse width increment is limited by the practical needs. In addition, the peak power of probe pulses is limited by the nonlinear effect threshold of the FUT. Specifically, it is limited by the stimulated Brillouin scattering (SBS) threshold; the estimated SBS threshold of the optical fiber is shown in Equation 1:

$$P_{cr} \approx 21 \cdot -A_{eff}/[g_B(\Omega_B) \cdot L_{eff}] \quad (1)$$

where $P_{cr}$ is an SBS threshold power; $A_{eff}$ is an effective area of the optical fiber; $g_B$ is a Brillouin gain; $\Omega_B$ is a Brillouin frequency shift; $L_{eff}$ is an effective length of the FUT. DAS systems typically use highly coherent laser with narrow linewidth, which further lowers the threshold of SBS. Once the Brillouin threshold is reached, SBS will transfer most power of the detecting light to the Stokes light with backward prorogation, resulting in significant loss of signal energy. Therefore, the peak power of input pulses of DAS systems cannot be higher than the SBS threshold of the optical fiber.

The present invention uses SDM to greatly improve the OSNR of the DAS system by accumulating the Rayleigh backscattering light of each core in the MCF, thereby it improves the strain resolution of the DAS system.

Referring to FIG. 1, a DAS system comprises: a signal generating device, and a signal receiving and demodulating device, and further comprises: a MCF 600 and a signal space-division transceiver array. The signal generating device, the signal space-division transceiver array, the MCF 600, and the signal receiving and demodulating device are sequentially connected to realize single-ended DAS based on the Rayleigh backscattering light within MCF.

The signal generating device comprises a narrow linewidth laser 100, a pulse modulation module 200, and a signal splitter 300. The signal space-division transceiver array comprises a circulator array 400, and a fan-in and fan-out device 500. The multi-line pulse coding sequences output from the signal generating device transmits into the second ports from the first ports of the circulator array 400, and then are input into the MCF 600 through the fan-in and fan-out device 500; the Rayleigh backscattering light generated in the MCF 600 inputs into the signal receiving and demodulating device from the fan-in and fan-out device 500 through the third ports of the circulator array 400.

The signal receiving and demodulating device comprises a signal combiner 700, an optical amplification and phase extraction module 800, a photodetector 901 and a signal demodulation module 1000, which are connected in sequence. The Rayleigh backscattering light within the MCF 600 is input into the light combiner 700 from the signal space-division transceiver array, in order to perform intensity accumulation of the Rayleigh backscattering light in an optical domain. Then, the optical amplification and phase extraction module 800, the photodetector 901, and the signal demodulation module 1000 are sequentially connected to implement signal reception and demodulation.

The continuous light emitted by the narrow linewidth laser 100 is modulated into pulse sequences by the pulse modulation module 200, and then is input into the signal splitter 300. The peak power and repetition rate of the pulse sequences output from each channel of the signal splitter 300 are $Q_i=P+q_i$ and $R=c/(4Ln)$, respectively. M is the core number of the MCF 600. P is the peak power limit of probe pulses in standard single-mode optical fiber. $q_i$ is the insertion loss of the signal in the i-th channel from a signal splitter 300 to the fan-in and fan-out device 500, wherein i≤M; c is a vacuum light speed; L is a length of the FUT; and n is the refractive index of optical fiber. The pulse sequences are input from the signal splitter 300 through the first ports of the circulator array 400 to the second ports, and then transmit into each core of the MCF 600 through the fan-in and fan-out device 500, where the peak power of probe pulses input into each core is P. The Rayleigh backscattering light of each core transmits from the fan-in and fan-out device 500 to the light combiner 700 through the third ports of the circulator array 400, and then inputs into the optical amplification and phase extraction module 800 with a small amount of energy loss, and then transmits into the photodetector 901. The electrical signal output from the photodetector 901 inputs into the signal demodulation module 1000 to obtain the frequency and amplitude of the external acoustic signal.

The optical amplification and phase extraction module 800 may use coherent detection, namely local oscillator light, for signal amplification and phase extraction, or combines an erbium-doped optical fiber amplifier and an interferometer for phase extraction. Both are prior arts and will not be described herein.

Figure 4:
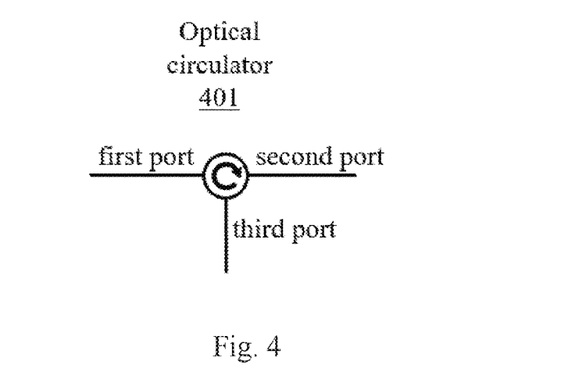
FIG. 4 is a schematic view of a circulator port of the present invention.

The FUT of the embodiment 1 is a 7-core MCF; the circulator array 400 has M circulators as shown in FIG. 1, and M is 7. Thus, the circulator array 400 has 7 identical circulators 401-407; the port illustration of each circulators 401-407 is shown in FIG. 4.

The present invention utilizes the intensity accumulation of the Rayleigh backscattering light in each core of the MCF to improve the OSNR of the DAS system, thereby improving the strain resolution of the DAS system as follows: The strain resolution γ of the DAS system is calculated by Equation 2:

$$\gamma = \frac{\varepsilon}{10^{SNR/20}} \quad (2)$$

where ε is an external applied strain, SNR is the signal-to-noise ratio obtained by demodulating the power spectral density (PSD) of phase signal, and the unit thereof is dB. The physical meaning represented by Equation 2 is the externally applied strain when the signal-to-noise ratio obtained from the PSD is 0 dB, namely the signal and the noise have the same energy level. It can be seen from Equation 2 that the larger the SNR of the signal, the smaller the value of γ, thus it improves the strain resolution of the DAS system.

By using the signal splitter 300 and the signal space-division transceiver array, the pulse peak power of each core within the MCF 600 can reach the nonlinear threshold of standard optical fiber. Meanwhile, the response obtained in each core of the MCF 600 can be accumulated by the light combiner 700 to increase the signal intensity of the DAS system. Thus, this technology can improve the OSNR of the DAS system, and can increase the strain resolution thereof, through the single-ended DAS system based on Rayleigh backscattering light within the MCF.

As for the DAS system using the transmitting light of the MCF 600, although the intensity of the transmitting light is much higher than the intensity of the Rayleigh backscattering light, this kind of system uses the phase difference caused by the propagation constant differences between different cores to locate and quantify external acoustic waves. This technology makes the robustness and strain sensitivity of the system lower than conventional DAS systems. At the same time, the probing module that launches input pulses and the receiving module need to be put at the two opposite ends of the FUT, but in harsh environments such as high temperatures under oil wells or high pressures in the deep-sea, it is very difficult to put precise instruments at both ends. However, the present invention maintains the advantages of single-ended detection and the responding bandwidth to the external acoustic signal in conventional DAS systems. At the same time, the present invention uses the accumulation effect of the received power within each core in the MCF 600. Thus, it can break through the bottleneck that the peak power limit of probe pulses in the DAS systems with standard optical fiber is limited by the nonlinear threshold. Thus, this technology greatly increases the intensity of the Rayleigh backscattering light, and improves the OSNR of the DAS system, so that it improves the strain resolution of the system.

Embodiment 2

Figure 2:
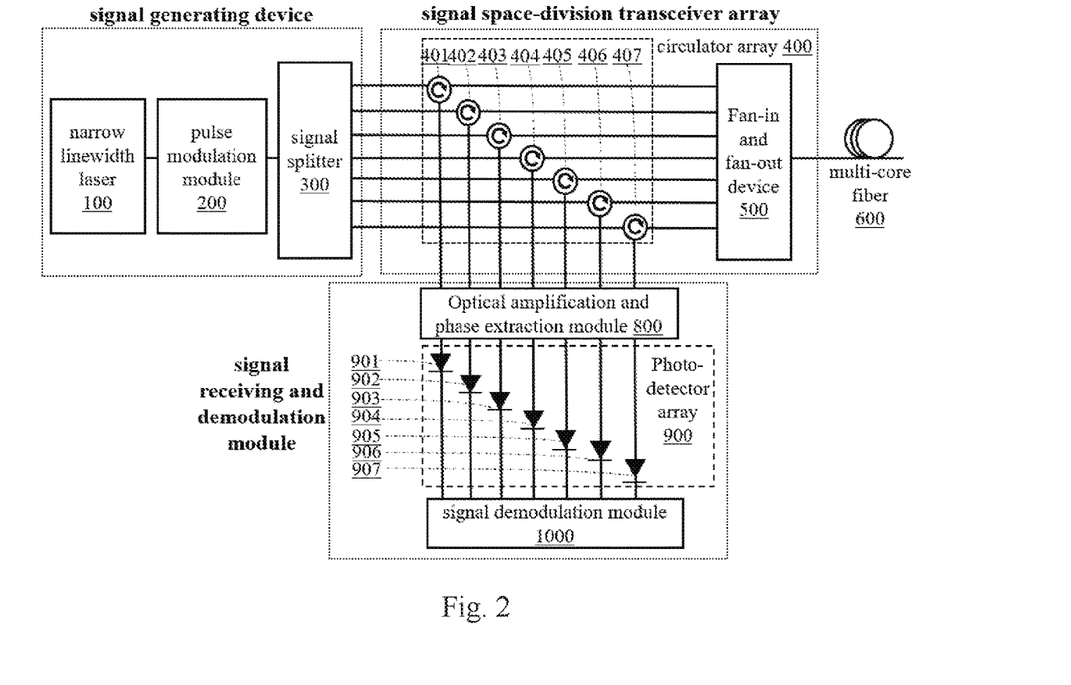
FIG. 2 is a system block diagram of an embodiment 2 of the present invention.

Referring to FIG. 2, based on the embodiment 1, the embodiment 2 uses digital signal accumulation to improve the signal intensity of the DAS system. Different from the embodiment 1: the signal space-division transceiver array comprises a circulator array 400, and a fan-in and fan-out device 500. The multi-line pulse coding sequences output from the signal generating device transmit into the second ports of the circulator arrays from the first ports, and then are input into the MCF 600 through the fan-in and fan-out device 500. The signal receiving and demodulating device comprises an optical amplification and phase extraction module 800, a photodetector array 900 and a signal demodulation module 1000. The Rayleigh backscattering light within each core of the MCF 600 is output from the fan-in and fan-out device 500 through the third ports of the circulator array 400, and then sequentially transmits into the optical amplification and phase extraction module 800, the photodetector array 900, and the signal demodulation module 1000. Through the technologies above, the received electrical signals of each channel can be accumulated, and then the signals are demodulated to obtain the frequency and amplitude of the external acoustic signals. The photodetector array 900 has M photodetectors. As shown in FIG. 2, M is 7, so the photodetector array 900 has 7 photodetectors 901-907.

This DAS system maintains the advantages of single-ended detection and the responding bandwidth of external acoustic signals in conventional DAS systems. Moreover, it uses the signal space-division transceiver array, the MCF and the photodetector array to accumulate the electrical signal output from each core of the MCF, namely sum the digital signal. This technology breaks the bottleneck that the peak power limit of probe pulses in the DAS systems with standard optical fiber. In detail, the power is limited by the nonlinear threshold in optical fiber. Thus, it can greatly increase the intensity of the Rayleigh backscattering light, and improves the OSNR of the DAS system, so that it can improve the strain resolution.

Embodiment 3

Figure 3:
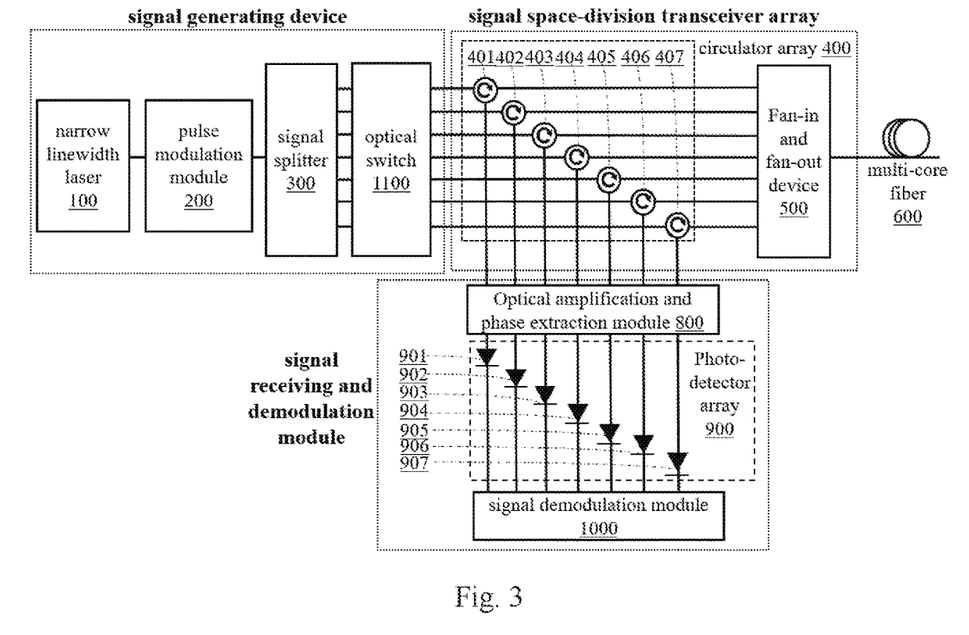
FIG. 3 is a system block diagram of an embodiment 3 or 4 of the present invention.

Referring to FIG. 3, based on the embodiment 2 combined with optical pulse coding, a DAS system is different from the embodiment 2 in that: the signal generating device comprises a narrow linewidth laser 100, a pulse modulation module 200 modulating continuous pulse sequences, a signal splitter 300, and an optical switch 1100. They are connected in sequence. The optical switch 1100 simultaneously outputs different pulse coding sequences into M channels, where M is the core number of the MCF 600. The signal space-division transceiver array comprises a circulator array 400, and a fan-in and fan-out device 500. The multi-line pulse coding sequences output from the signal generating device transmit into the second ports from the first ports of the circulator array 400, and then are input to the MCF 600 through the fan-in and fan-out device 500 for transmission. The signal receiving and demodulating device comprises an optical amplification and phase extraction module 800, a photodetector array 900 and a signal demodulation module 1000. The Rayleigh backscattering light within each core of the MCF 600 is output from the fan-in and fan-out device 500 through the third ports of the circulator array 400, and then sequentially transmits into the optical amplification and phase extraction module 800, the photodetector array 900, and the signal demodulation module 1000.

It is assumed that the coding pulse sequences used in the DAS system have m columns, and each of sequence has b bits; the time interval between each bit is w, and the pulse width of each bit is r.

The pulse coding sequences output from the optical switch 1100 needs to satisfy the conditions described in Equations 3 and 4:

$$m < M \tag{3}$$

$$(b-1)w + \tau < \frac{c}{2Ln} \tag{4}$$

The interval w between adjacent pulses output from the pulse modulation module 200 needs to satisfy the condition described in Equation 5:

$$w > 2\Delta t_{switch} \tag{5}$$

where $\Delta t_{switch}$ is a fastest switching time of the optical switch 1100.

The signal demodulation module 1000 receive responses of the m code sequences and then decodes them according to the coding type.

Figure 5:
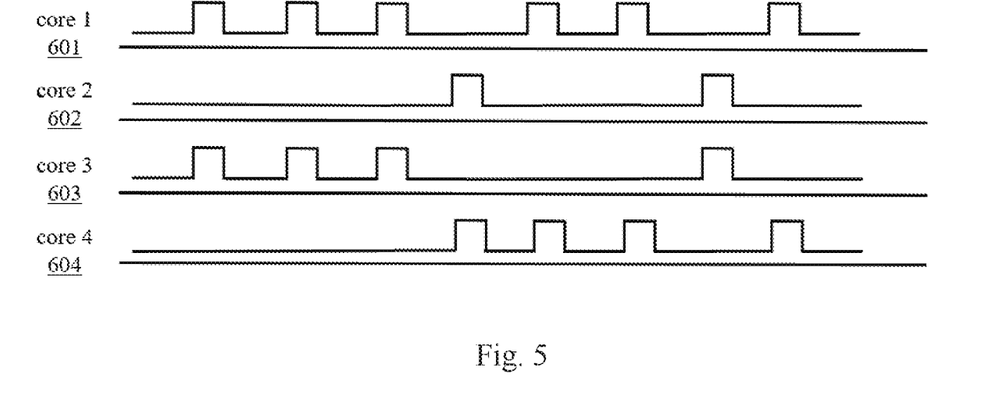
FIG. 5 is a schematic diagram of pulse transmission in a MCF in a DAS system employing 4-channel SDM and 7-bit Golay complementary sequence optical pulse coding.

FIG. 5 is a schematic diagram of probe pulses transmitted in the MCF 600 for a DAS system with 4-channel SDM and 7-bit Golay complementary sequence optical pulse coding. If SDM is not used, the optical pulse coding of Golay complementary sequence with 4-line and 7-bit brings the coding gain of $\sqrt{7}/2$, but a highest response frequency of the DAS system is reduced by 4 times. However, with SDM, 4 cores with similar stress environment are selected for transmission of the code sequences in the 7-core MCF, wherein each of the selected 4 cores transmits a different coding sequence, and the responses of the 4-line coding sequences can be received at the same time. After cross-correlation demodulation, the single-pulse response with coding gain can be obtained. Since the responses of the 4-line coding sequences are simultaneously received, for this kind of DAS system, the highest response frequency of external acoustic signals does not sacrifice much. The highest response frequency of external acoustic signals is shown in Equation 6:

$$Q_{SDM \& OPC} = \frac{1}{2\left(\frac{2Ln}{c} + (b-1)w + \tau\right)} \tag{6}$$

where $(b-1)w+\tau$ is much less than $c/2Ln$, so the highest response frequency to the external acoustic signals does not sacrifice much compared to the non-coding DAS system.

This DAS system maintains the advantage of single-ended measurement through the combination of the optical switch 1100 in the signal generating device, the signal space-division transceiver array and the photodetector array 900. Different coding sequences can be simultaneously transmitted in different cores of the MCF 600. Thus, the single-pulse response with coding gain can be quickly demodulated, and it avoids the sacrifice of the frequency responding bandwidth in the DAS system with optical pulse coding using standard single-core optical fiber. As a result, the DAS system can greatly improve the OSNR of the system through the coding gain without sacrificing the frequency responding bandwidth, and improve the strain resolution of the DAS system.

Embodiment 4

For a normal DAS system, when the Rayleigh backscattering light of one probe pulse is completely received by the photodetector, the next probe pulse can be input into the fiber; otherwise, the responses of the two pulses will overlap in the time domain, thereby there will be interference, and there will be crosstalk in the responses of the two pulses. The response lasting time T of the Rayleigh backscattering light of a probe pulse is shown in Equation 7:

$$T = 2Ln/c \tag{7}$$

where L is a length of the FUT, and n is an optical fiber refractive index. c is the vacuum light speed. For the standard DAS system with single pulse single, the response duration is limited by the length of the FUT. For an external acoustic signal, getting the response of one pulse means sampling once. Therefore, according to the Nyquist sampling theorem, for standard DAS systems, the highest responding frequency to the external acoustic signal is shown in Equation 8:

$$Q = c/4Ln \tag{8}$$

The FDM technology can improve the highest responding frequency of external acoustic signals for DAS systems to a certain extent. If the number of intermediate frequency is F, the maximum responding frequency of the DAS system will increase by F times. However, since in frequency domain, the aliasing cannot occur among the signals with different intermediate frequency, and the highest intermediate frequency used in FDM is limited by the sampling bandwidth, the value of F is limited. The present invention introduces a DAS system that uses MCF to substantially increase the frequency responding bandwidth of external acoustic signals.

As shown in FIG. 3, based on the embodiment 3, a DAS system comprises a signal receiving and demodulating device, a signal generating device for generating the multi-channel pulse sequences with precise time delay, the MCF 600 and a signal space-division transceiver array. The signal generating device, the signal space-division transceiver array, the MCF 600, and the signal receiving and demodulating device are sequentially connected to realize single-ended DAS based on the Rayleigh backscattering light within MCF.

The signal generating device comprises a narrow linewidth laser 100, a pulse modulation module 200 that modulates continuous pulse sequences, a signal splitter 300, and an optical switch 1100 for accurately delaying a response time of each core of the MCF 600. The devices mentioned-above are connected in sequence. The optical switch 1100 accurately delays the pulses within each output channel of the signal splitter 300, and then inputs the pulses to the signal space-division transceiver array for transmitting in the MCF 600. The signal space-division transceiver array comprises a circulator array 400, and a fan-in and fan-out device 500; multi-line pulse coding sequences output from the signal generating device transmit into the second ports from the first ports of the circulator array 400, and then is input into the MCF 600 through the fan-in and fan-out device 500.

The signal receiving and demodulating device comprises an optical amplification and phase extraction module 800, a photodetector array 900 and a signal demodulation module 1000. The Rayleigh backscattering light within each core of the MCF 600 is output from the fan-in and fan-out device 500 through the third ports of the circulator array 400, and then sequentially transmits into the optical amplification and phase extraction module 800, the photodetector array 900, and the signal demodulation module 1000. Therefore, the reception of time-lapse response within each core can be achieved, which improves the sampling rate of the external acoustic signals for DAS systems, thereby greatly increasing the frequency responding bandwidth to the external acoustic signals.

Figure 6:
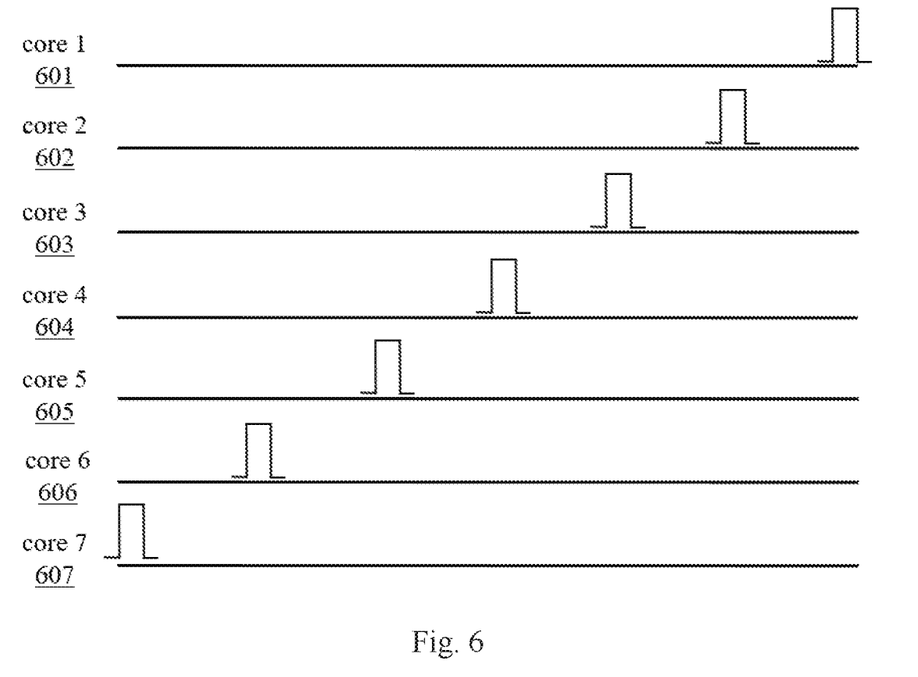
FIG. 6 illustrates principles of the embodiment 4 of the present invention.
Figure 7:
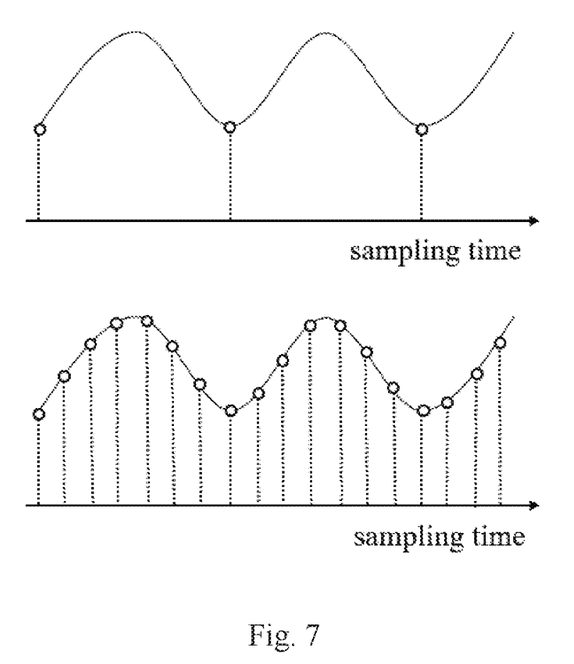
FIG. 7 illustrates the comparison of sampling time intervals to external acoustic signals with/without SDM according to the embodiment 4.

The repetition rate R of the pulse sequences output from the pulse modulation module 200 in the signal generating device is $Mc/2Ln$; the repetition rate of pulses output from each channel of the optical switch 1100 is $c/2Ln$; and the input pulse time delay of adjacent channels is $2Ln/(M-1)c$. M is the core number of the MCF 600; c is a vacuum light speed; L is a length of the FUT; and n is an optical fiber refractive index. FIG. 6 illustrates the principles of using SDM to improve the sampling rate of the external acoustic signals with a 7-core MCF. As shown in FIG. 6, with SDM, it is not necessary to input another probe pulse when one pulse completely transmits out of the FUT. Instead, 7 pulses can be transmitted simultaneously in the MCF 600. Thus, the sampling rate of the DAS system for external acoustic signals can be increased by 7 times. If SDM is not used, the accurate frequency of the acoustic signal shown in FIG. 7 cannot be obtained, as shown in FIG. 7(a). If SDM is used, the sampling rate of the DAS system for external acoustic signals can be increased by 7 times. That is to say, the frequency responding bandwidth of external acoustic signals is increased by 7 times, so that the accurate frequency of the acoustic signal shown in FIG. 7 can be obtained, as shown in FIG. 7(b). The highest responding frequency of the DAS system using SDM for external acoustic signals is shown in Equation 9:

$$Q_{SDM} = Mc/4Ln \qquad (9)$$

where M is the core number of the MCF 600; c is a vacuum light speed; L is a length of the FUT; and n is an optical fiber refractive index. It can be seen from Equation 9 that the DAS system using SDM increases the highest responding frequency of the external acoustic signal by M times, namely the responding bandwidth of the DAS system is increased by M times.

While maintaining the advantage of single-ended detection, this system realizes the reception of multiple spatial channel responses with accurate time-delay, based on the optical switch for delaying the pulse input time of each core within the MCF, which improves the sampling rate of the external acoustic signal of the DAS system. Therefore, for this kind of DAS system, the frequency responding bandwidth of the external acoustic signals can be greatly improved.

One skilled in the art will understand that the embodiment of the present invention as shown in the drawings and described above is exemplary only and not intended to be limiting. Therefore, this invention includes all modifications encompassed within the spirit and scope of the following claims.

What is claimed is:

1. A distributed acoustic sensing (DAS) system based on space-division multiplexing (SDM) with multi-core optical fiber (MCF), comprising: a signal generating device, and a signal receiving and demodulating device, and further comprising: a MCF and a signal space-division transceiver array: wherein the signal generating device, the signal space-division transceiver array, the MCF, and the signal receiving and demodulating device are sequentially connected to realize a single-ended DAS system based on Rayleigh backscattering light within MCF: wherein:

the signal space-division transceiver array comprises a circulator array, and a fan-in and fan-out device; pulse sequences output from the signal generating device input into first ports of the circulator array, and then output from second ports of the circulator array, after that, the pulse sequences are input into the MCF through the fan-in and fan-out device for transmission:

a Rayleigh backscattering light of the MCF enters the signal receiving and demodulating device from the fan-in and fan-out device through a-third ports of the circulator array;

the signal receiving and demodulating device comprises a signal combiner, an optical amplification and phase extraction module, a photodetector and a signal demodulation module, which are connected in sequence; the Rayleigh backscattering light of the MCF is input into a light combiner from the signal space-division transceiver array, in order to perform intensity accumulation of Rayleigh backscattering light in optical domain; or the signal space-division transceiver array comprises a circulator array, and a fan-in and fan-out device; multi-line pulse sequences output from the signal generating device are transmitted from first ports of the circulator array to second ports, and then are input into the MCF through the fan-in and fan-out device for transmission:

the signal receiving and demodulating device comprises an optical amplification and phase extraction module, a photodetector array and a signal demodulation module; the Rayleigh backscattering light within each core of the MCF is output from the fan-in and fan-out device through third ports of the circulator array, and then sequentially connects the optical amplification and phase extraction module, the photodetector array, and the signal demodulation module, in order to perform signal reception and demodulation after digital signal accumulation.

2. The DAS system, as recited in claim 1, wherein the peak power $Q_i$ and repetition rate $R_{add}$ of a modulated pulse sequence output from M channels of the signal generating device are as follows:

$$Q_i = P + q_i$$

$$R_{add} = c/(2Ln)$$

where M is a core number of the MCF; P is an intensity threshold of pulse peak power within standard optical fiber; $q_i$ is a whole insertion loss of signal transmitted in the i-th channel from a signal splitter to the fan-in and fan-out device, wherein i≤M; c is a vacuum light speed; L is a length of a fiber under test (FUT); and n is an optical fiber refractive index.

3. A distributed acoustic sensing (DAS) system based on space-division multiplexing (SDM) with multi-core optical fiber (MCF), comprising: a signal generating device, and a signal receiving and demodulating device, and further comprising: a MCF and a signal space-division transceiver array; wherein the signal generating device, the signal space-division transceiver array, the MCF, and the signal receiving and demodulating device are sequentially connected to realize a single-ended DAS system based on Rayleigh backscattering light within MCF: wherein:

the signal generating device comprises a narrow linewidth laser, a pulse modulation module modulating a continuous pulse sequence, a signal splitter, and an optical switch connected in sequence; the optical switch simultaneously output different pulse coding sequences into M output channels, where M is a core number of the MCF;

the signal space-division transceiver array comprises a circulator array, and a fan-in and fan-out device; multi-line pulse coding sequences output from the signal generating device transmit into second ports from first ports of the circulator array, and then are input into the MCF through the fan-in and fan-out device;

the signal receiving and demodulating device comprises an optical amplification and phase extraction module, a photodetector array and a signal demodulation module; the Rayleigh backscattering light within each core of the MCF is output from the fan-in and fan-out device through third ports of the circulator array, and then sequentially transmits into the optical amplification and phase extraction module, the photodetector array, and the signal demodulation module.

4. The DAS system, as recited in claim 3, wherein for the pulse sequences output from the pulse modulation module, an interval time w between adjacent pulses must satisfy the following condition:

$$w > 2\Delta t_{switch}$$

where $\Delta t_{switch}$ is a fastest switching time of the optical switch;

the pulse coding sequences output from the optical switch must satisfy the following conditions:

$$m < M$$

$$(b-1)w + \tau < \frac{c}{2Ln}$$

where τ is a pulse width output from the pulse modulation module, m is a column number of pulse coding sequences output from the optical switch, b is a bit number contained in each pulse coding sequence, c is a vacuum light speed; L is a length of a fiber under test (FUT); and n is an optical fiber refractive index.

5. A distributed acoustic sensing (DAS) system based on space-division multiplexing, comprising: a signal receiving and demodulating device, and further comprises: a signal generating device for generating multi-channel pulse sequences with precise time delay, a multi-core optical fiber (MCF) and a signal space-division transceiver array, wherein the signal generating device, the signal space-division transceiver array, the MCF, and the signal receiving and demodulating device are sequentially connected to realize single-ended DAS based on the Rayleigh backscattering light within the MCF: wherein:

the signal generating device comprises a narrow linewidth laser, a pulse modulation module that can output continuous pulse sequences, a signal splitter, and an optical switch to accurately delay the response time of each core of the MCF, which are connected in sequence; the optical switch accurately delays the pulse input time of each output channel of the signal splitter;

the signal space-division transceiver array comprises a circulator array, and a fan-in and fan-out device; the multi-line pulse coding sequences output from the signal generating device transmit into the second ports from the first ports of the circulator array, and then are input into the MCF through the fan-in and fan-out device for transmission;

the signal receiving and demodulating device comprises an optical amplification and phase extraction module, a photodetector array and a signal demodulation module;

a Rayleigh backscattering light within each core of the MCF is output from the fan-in and fan-out device through the third ports of the circulator array, and then sequentially transmits into the optical amplification and phase extraction module, the photodetector array, and the signal demodulation module, in order to delay a receiving time of the response of each core in the MCF.

6. The DAS system, as recited in claim 5, wherein a repetition rate R of the pulse sequences output from the pulse modulation module in the signal generating device is Mc/2Ln; a pulse repetition rate of the pulse sequences output from each channel of the optical switch is c/2Ln; and an input pulse time delay between adjacent channels is 2Ln(M−1)c; wherein M is a core number of the MCF; c is a vacuum light speed; L is a length of the MCF; and n is an optical fiber refractive index.

* * * * *